United States Patent
Dunstan et al.

(10) Patent No.: US 9,104,821 B2
(45) Date of Patent: Aug. 11, 2015

(54) UNIVERSAL SERIAL BUS HOST TO HOST COMMUNICATIONS

(75) Inventors: Robert A. Dunstan, Forest Grove, OR (US); Gary A. Solomon, Acton, MA (US); Joseph A. Schaefer, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/319,192

(22) Filed: Dec. 31, 2008

(65) Prior Publication Data

US 2010/0169511 A1 Jul. 1, 2010

(51) Int. Cl.
*G06F 3/00* (2006.01)
*G06F 13/42* (2006.01)

(52) U.S. Cl.
CPC ......... *G06F 13/4295* (2013.01); *Y02B 60/1228* (2013.01); *Y02B 60/1235* (2013.01)

(58) Field of Classification Search
USPC .......................................................... 710/15
See application file for complete search history.

(56) References Cited

U.S. PATENT DOCUMENTS

| | | | |
|---|---|---|---|
| 6,993,618 B2 | 1/2006 | Chen et al. | |
| 7,000,057 B1 * | 2/2006 | Novell et al. | 710/306 |
| 7,085,876 B2 * | 8/2006 | Lai et al. | 710/313 |
| 7,608,490 B2 * | 10/2009 | Yamazaki et al. | 438/149 |
| 7,635,280 B1 * | 12/2009 | Crumlin et al. | 439/489 |
| 7,698,490 B2 * | 4/2010 | Terrell, II | 710/302 |
| 2004/0019732 A1 | 1/2004 | Overtoom et al. | |
| 2004/0088449 A1 | 5/2004 | Sakaki et al. | |
| 2004/0243755 A1 | 12/2004 | Lee et al. | |
| 2005/0087600 A1 | 4/2005 | Sheng | |
| 2006/0123175 A1 * | 6/2006 | Yu et al. | 710/305 |
| 2007/0033308 A1 | 2/2007 | Teng et al. | |
| 2008/0141259 A1 | 6/2008 | Tjia et al. | |
| 2008/0159307 A1 | 7/2008 | Roe | |
| 2008/0222341 A1 | 9/2008 | Lin et al. | |
| 2010/0110305 A1 * | 5/2010 | Chou et al. | 348/726 |
| 2011/0170482 A1 * | 7/2011 | Dhanda | 370/328 |

FOREIGN PATENT DOCUMENTS

| | | | |
|---|---|---|---|
| CN | 1310402 A | 8/2001 | |
| CN | 1508705 A | 6/2004 | |
| CN | 1811726 A | 8/2006 | |
| WO | 2010/078179 A2 | 7/2010 | |
| WO | 2010/078179 A3 | 10/2010 | |

OTHER PUBLICATIONS

Adminspy; "USB 3.0 Specifications Announced"; Nov. 21, 2008; http://www.adminspy.com/Technology-News/usb_3.0_specifications_announced.html.*

(Continued)

*Primary Examiner* — Elias Mamo
(74) *Attorney, Agent, or Firm* — International IP Law Group, PLLC

(57) ABSTRACT

In some embodiments a detector detects a host or device coupled via a link. A port negotiates with a port of the detected host or device and determines whether to operate as a host and/or as a device. Other embodiments are described and claimed.

23 Claims, 5 Drawing Sheets

(56) References Cited

OTHER PUBLICATIONS

My Digital Life; "Super Speed USB 3.0 Specification is Finalized and Available to Developers"; Nov. 21, 2008; http://www.mydigital-life.info/2008/11/21/super-speed-usb-30-specification-is-finalized-and-available-to-developers.*

Brooke Crothers; "Finalizes speedy USB 3.0 spec debuts"; Nov. 17, 2008; http://news.cnet.com/8301-17938_105-10098216-1.html.*

Adminspy; "USB 3.0 Specifications Announced"; Nov. 21, 2008; http://www.adminspy.com/Technology-News/usb_3.0_specifications_an nounced.html.*

Adminspy; "USB 3.0 Specifications Announced"; Nov. 21, 2008; http://www.adminspy.com/Technology-News/usb_3.0_specifications_announced. html.*

International Search Report and Written Opinion Received for PCT Patent Application No. PCT/US2009/069354, mailed on Aug. 16, 2010, 9 pages.

HP Company et al., "Universal Serial Bus 3.0 specification," Nov. 12, 2007, pp. 3-12.

Office Action received for German Patent Application No. 112009004327.5, mailed on Jan. 16 2012, 4 pages.

Office Action received for United Kingdom Patent Application No. 1113200.8, mailed on Dec. 4, 2013, 2 pages of Office Action only.

Office Action received for United Kingdom Patent Application No. 1113200.8, mailed on May 12, 2014, 2 pages of Office Action only.

Office Action received for Chinese Patent Application No. 200980155569.2, mailed on Jun. 28, 2013, 17 pages of Office Action including 10 pages of English Translation.

International Preliminary Report on Patentability and Written Opinion received for PCT Patent Application No. PCT/US2009/069354, mailed on Jul. 14, 2011, 6 pages.

Office Action Received for Chinese Patent Application No. 200980155569.2. mailed on Feb. 12, 2014, 7 pages of Office Action Including 4 pages of English Translation.

Solomon, Gary A., et al., "Asymmetrical Universal Serial Bus Communications", U.S. Appl. No. 12/215,988, filed Jun. 30, 2008.

* cited by examiner

UNIVERSAL SERIAL BUS HOST TO HOST COMMUNICATIONS

TECHNICAL FIELD

The inventions generally relate to Universal Serial Bus (USB) host to host communications.

BACKGROUND

Universal Serial Bus (USB) is a widely used serial bus standard used to interface devices. USB was originally designed for computers as a plug-and-play interface between a computer and add-on devices such as, for example, audio players, joysticks, keyboards, digital cameras, scanners and printers, etc. However, the popularity of USB has prompted it to also become commonplace on other devices such as, for example, video game consoles, portable digital assistants (PDAs), portable digital video disk (DVD) and media players, cell phones, televisions (TVs), home stereo equipment such as MP3 players, car stereos, and portable memory devices. USB can be used to connect peripherals such as mouse devices, keyboards, gamepads, joysticks, scanners, digital cameras, printers, external storage, networking components, and many other devices.

As discussed above, USB is a serial bus standard to interface devices. USB is designed to allow many peripherals to be connected using a single standardized interface socket and to improve plug-and-play capabilities by allowing devices to be connected and disconnected without rebooting the computer. USB also provides power to low consumption devices eliminating the need for an external power supply. Common class drivers included with the operating system generally remove the need to install device drivers.

The USB 1.0 specification is an external bus standard introduced in November 1995 that supports data transfer rates of 12 Mbps (Megabits per second). Starting in 1996, a few computer manufacturers began including USB support in their new machines, and it became widespread by 1998 when as evidenced by its use as the primary connector on the original Apple iMac. The USB connector was used to replace PS2, serial and parallel ports. USB 2.0, which supports Low-speed, Full-speed, and High-speed USB implementations, is an external bus that supports data rates up to 480 Mbps. USB 2.0 is fully backwards compatible with USB 1.0, and uses the same cables and connectors. The USB 2.0 specification was released in April 2000.

The USB 3.0 specification was released in November 2008. It defines SuperSpeed USB at a data rate of 5 Gbps (Gigabits per second). Therefore, USB 3.0 provides bus speeds ten times faster than USB 2.0.

Peer to peer connections between USB hosts (for example, for USB1 and/or USB 2.0 applications) may be accomplished by using a special host to host cable. The special host to host cable includes a considerable amount of electronic hardware, and is really two Ethernet USB devices, each connected to a host. The Ethernet USB devices are connected together via an Ethernet cable. In this manner, the special host to host cable includes a directly connected pair of back to back USB Ethernet network controllers. However, such a solution requires proprietary driver and application level software to be installed at both ends of the connection, imposing significant throughput limitations due to the overhead of USB packet and Internet Protocol (IP) packet processing software stacks at both ends of the data transfer. For example, a typical 100 Mb/sec Ethernet Network Interface Card (NIC) can achieve roughly 50 Mb/sec due to transport inefficiencies and IP packet processing software overhead. Further, USB packet processing overhead causes additional impact, resulting in a performance that is a constrained solution (for example, a constrained USB 2.0 solution). Therefore, a need has arisen for a better peer to peer USB connection solution.

BRIEF DESCRIPTION OF THE DRAWINGS

The inventions will be understood more fully from the detailed description given below and from the accompanying drawings of some embodiments of the inventions which, however, should not be taken to limit the inventions to the specific embodiments described, but are for explanation and understanding only.

DETAILED DESCRIPTION

Figure 1:
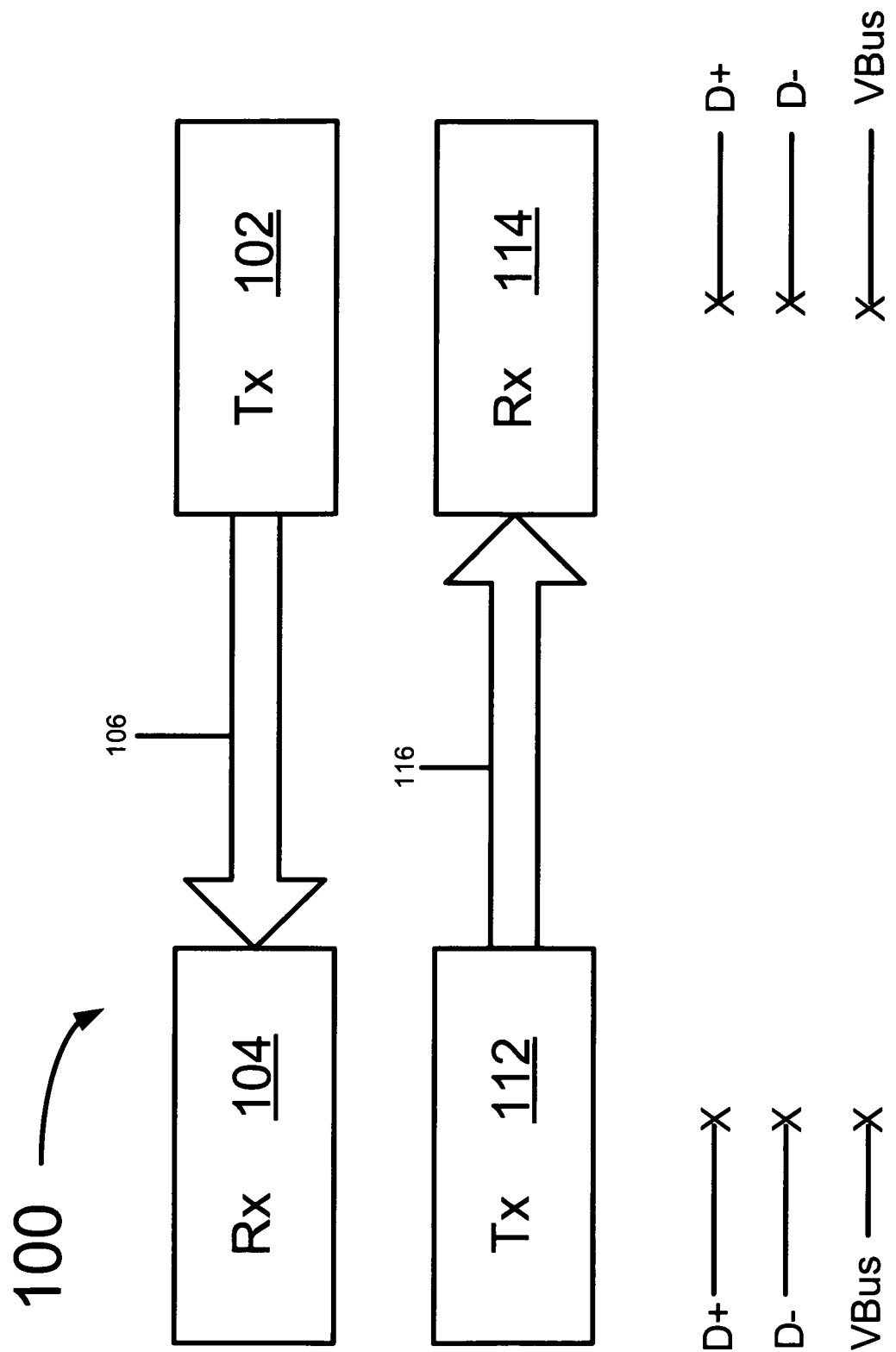
FIG. 1 illustrates a system according to some embodiments of the inventions.

Some embodiments of the inventions relate to Universal Serial Bus (USB) host to host communications.

In some embodiments a detector detects a host or device coupled via a link. A port negotiates with a port of the detected host or device and determines whether to operate as a host and/or as a device.

In some embodiments, a system includes a first host and a second host. The second host includes a detector to detect the first host coupled to the second host via a link, and a port to negotiate with a port of the first host and to determine whether the second host is to operate as a host and/or as a device.

In some embodiments, a host or device coupled via a link is detected, a port of the detected host or device is negotiated with, and it is determined whether to operate as a host and/or as a device in response to the negotiating.

In some embodiments host logic allows operation as a host, device logic allows the operation as a device, and a detector detects a coupled cable, and indicates whether the host logic or the device logic is to be coupled to the cable.

In some embodiments, a cable couples a first host and a second host. The second host includes host logic to allow operation as a host, device logic to allow operation as a device, and a detector to detect a coupled cable, and to indicate whether the host logic or the device logic is to be coupled to the cable.

In some embodiments, a coupling condition of a cable is detected, and an indication as to whether to operate as a host or as a device is made in response to the detecting.

It is noted that the terms "device" and "client" herein have been used interchangeably, and are intended to mean the same thing (for example, "USB device" and "USB client").

A USB system has an asymmetric design, including a host, a multitude of downstream USB ports, and multiple peripheral devices (or clients) connected, for example, in a tier-star topology. USB devices may be linked in series through hubs, including one hub (root hub) that is built into the host controller. When a USB device is first connected to a USB host, a USB enumeration process is started by sending a reset signal to the USB device. After reset, USB device information is sent to the host and the device is assigned a unique address.

If the device is supported by the host, device drivers needed for communicating with the device are loaded and the device is set to a configured state. The host controller directs traffic flow to the devices so that no USB device can transfer any data on the bus without an explicit request from the host controller. In USB 2.0, the host controller polls the bus for traffic (for example, in a round robin fashion). In USB 3.0 (SuperSpeed USB), a connected device can asynchronously request service from the host.

USB 3.0 adds additional features to the procedure described above. In particular, a bus training sequence is used to establish the communications between ports that is part of the response to detecting a connection. Upon initial contact, there is an exchange of information between the ports. This also happens whenever two ports are connected (for example, a device to a host or a device to a hub). Host ports have the ability to declare themselves downstream ports (as in the normal case) or as upstream ports (in a manner similar to a USB device). This allows one host to act as a device. Therefore, a USB 3.0 peer-to-peer connection is possible according to some embodiments.

FIG. 1 illustrates a system 100 according to some embodiments. In some embodiments system 100 includes a transmit block 102, a receive block 104, a transmission line 106 (for example, a differential pair), a transmit block 112, a receive block 114, a transmission line 116 (for example, a differential pair), and two other signal lines (labeled D+ and D− in FIG. 1).

In some embodiments, in a USB implementation a differentially driven receive block and a differentially driven transmit block of logic appoint opposite ends of a USB cable. In addition to the differentially driven transmit and receive blocks, in some embodiments a USB interconnect includes two other signal lines (D+ and D−) used for link management and other lower bandwidth (for example, up to 480 Mbps) data communications applications.

USB 2.0 signals are transmitted on a twisted pair data cable (labeled D+ and D− in FIG. 1). These cables D+ and D− collectively use half-duplex differential signaling. D+ and D− usually operate together; they are not separate simplex connections. Transmitted signal levels are, for example, 2.8-3.6 volts in Full-speed (FS) and Low-speed (LS) modes, and ±400 mV in High-speed (HS) mode. USB 2.0 uses a special protocol to negotiate the High-speed mode called "chirping". In simplified terms, a device that is HS capable always connects as an FS device first, but after receiving a USB RESET (where both D+ and D− are driven LOW by the host) it tries to pull the D− line high. If the host (or hub) is also HS capable, it returns alternating signals on D− and D+ lines letting the device know that the tier will operate at High-speed.

SuperSpeed (for example, USB 3.0) is a dual simplex connection that supports concurrent IN and OUT transactions. Its dual simplex signaling levels and spread spectrum clocking are similar to another dual simplex serial interconnect, PCI Express™. Differential swing is approximately the same for USB 3.0 as for USB 2.0 High Speed, but a spread clock is used as opposed to the non-spread USB 2.0 HS clock.

Transmitter 102 and receiver 114 may be included, for example, in a host device while transmitter 112 and receiver 104 may be included, for example, in a client device. However, in some embodiments, host to host communication may be beneficial. For example, in some embodiments, transmitter 102 and receiver 114 may be included in a first host and transmitter 112 and receiver 104 may be included in a second host.

In some embodiments, two USB host systems (for example, two USB 3.0 host systems) can be connected and/or coupled together. For example, in some embodiments, a personal computer (PC) with Viiv technology can be connected and/or coupled with a notebook computer (for example, a notebook computer with Centrino technology) via a USB connection. In some embodiments, a high bandwidth connection is made between systems in a manner that is ideal for transferring large media files. For example, such a high bandwidth connection is used to rapidly transfer large media files containing standard definition (SD) content and/or high definition (HD) content (for example, from a personal computer to a notebook computer for later playback). In some embodiments, the high bandwidth connection does not require any specific or additional support from a specification (for example, from a USB specification such as a USB 2.0 or a USB 3.0 specification). In some embodiments, the high bandwidth connection uses unmodified USB type-A receptacles (for example, unmodified USB 3.0 type-A receptacles). In some embodiments, the operation of the high bandwidth connection is transparent to the user. In some embodiments, existing USB device class drivers may be used (for example, existing USB 3.0 device class drivers). In some embodiments, ports with capability for such a high bandwidth connection may act as a USB device with any USB host controller implementation.

In some embodiments, a personal computer equipped with a capability to act as a USB host or a USB device may couple to a USB host using a special USB A to USB A connector (rather than the typical USB A to USB micro-B or Standard B cable).

Figure 2:
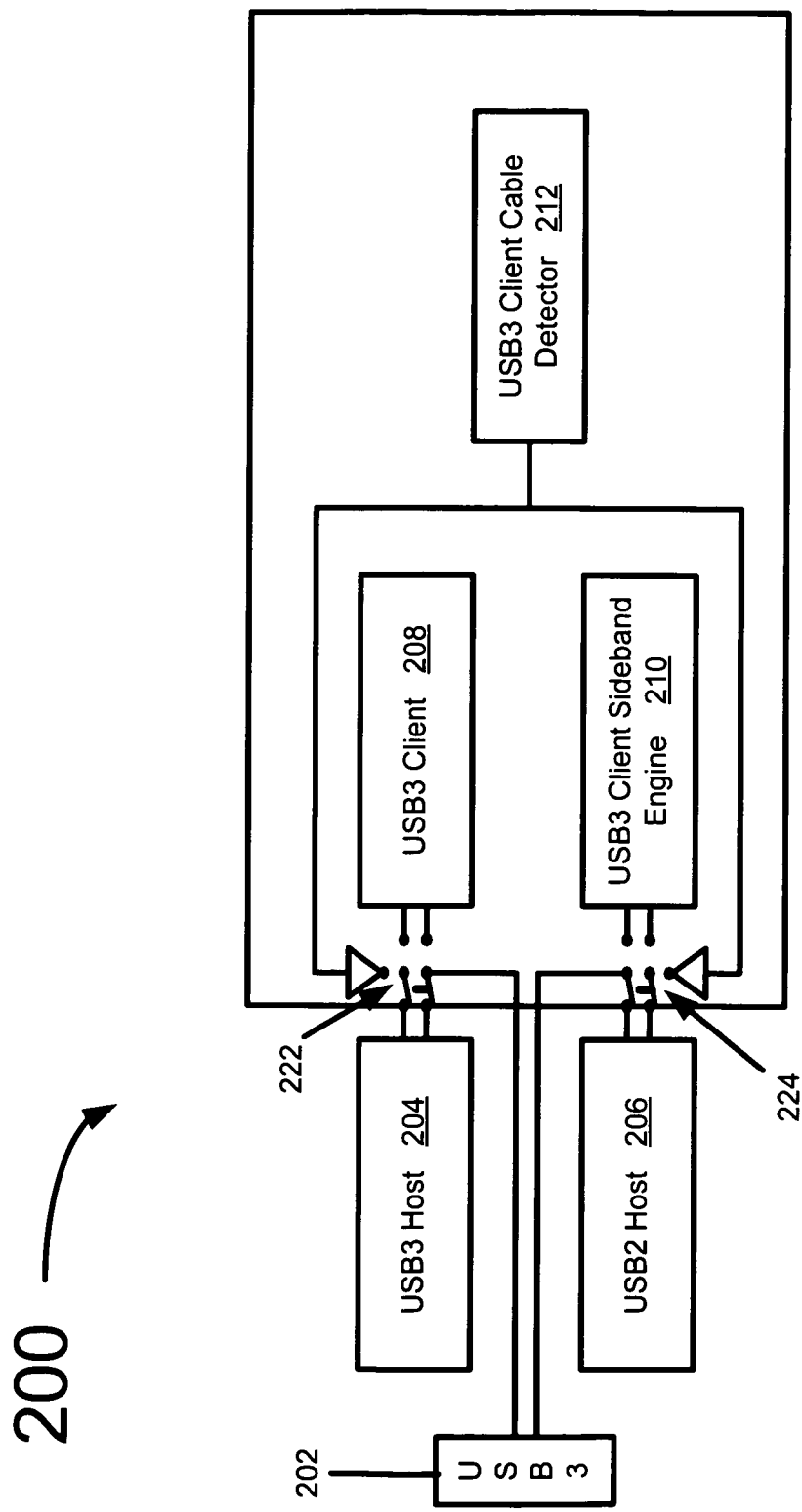
FIG. 2 illustrates a system according to some embodiments of the inventions.

FIG. 2 illustrates a system 200 according to some embodiments. In some embodiments system 200 includes a USB 3.0 receptacle 202, a USB 3.0 host 204, a USB 2.0 host 206, a USB 3.0 client 208, a USB 3.0 client sideband engine 210, a USB 3.0 client cable detector 212, a switch 222, and a switch 224. In system 200, the USB 3.0 client 208, the USB 3.0 client sideband engine 210, and the USB 3.0 client cable detector 212 are added to a basic USB 3.0 host.

In some embodiments, a passive crossover cable (for example, passive USB crossover cable such as a passive USB 3.0 crossover cable) may be used. From the user's perspective, the connection between two hosts (with one host acting as the host and one acting as the device) works when the cable is plugged in. Any sync and go application that was based on a drive letter simply works from the perspective of the user. In this manner, the throughput efficiency is very high since there are no intermediary devices (between the host and the host operating as the device).

In some embodiments (for example, as illustrated in FIG. 2) a USB 3.0 device interface (for example, a hardware USB 3.0 device interface) can be attached to a USB 3.0 PHY in a USB 3.0 host controller and shared with the USB 3.0 host. For example, such a USB 3.0 device interface is illustrated in FIG. 2 including USB 3.0 client 208, USB 3.0 client sideband engine 210, and USB 3.0 client cable detector 212. In some embodiments a presence detection mechanism (for example, USB 3.0 client cable detector 212) is used to detect use of a special USB A (host) to USB A (device) cable. In some embodiments, assignment of the USB 3.0 host to USB 3.0 device relationship between the hosts (for example, two personal computers or PCs) is based on an insertion orientation of the special USB A to USB A cable. In some embodiments, load driver software that presents the device (or client) side is loaded to the host illustrated in FIG. 2 as a standard USB device class interface so that the host system 200 can operate as a device (client) in some implementations.

In some embodiments, a port of the host or device at each end of the link uses port capability link management packets that describe each port's link capabilities, and is sent by both link partners after the successful completion of training and link initialization. In some embodiments, the ports at each end of the link negotiate with each other to determine how the host/device at each end of the link will operate. In some embodiments, a bus training sequence is used to establish the communications between ports at each of the hosts that is part of the response to detecting a connection between the two hosts. Upon initial contact, there is an exchange of information between the ports. This exchange also happens whenever two ports are connected (for example, a device to a host or a device to a hub). Host ports have the ability to declare themselves downstream ports (as in the normal case) or as upstream ports (in a manner similar to a USB device). This allows one host to advertise that it can act as a device. Therefore, a peer-to-peer connection is possible according to some embodiments.

In some embodiments, the USB A to USB A cable connecting the hosts is an entirely passive cable (for example, a crossover cable with D+, D−, and VBus not connected. In some embodiments, the direction (that is, which host will operate as the host and which will operate as the device) can be established using, for example, hardware and/or hardware controller by software at one or both of the hosts coupled to the cable. In some embodiments, the host operating as the host and the host operating as the device can be dynamically swapped using hardware and/or software at one or both of the hosts.

In some embodiments, one host acts as a host and one host acts as a device. In some embodiments, two hosts each act simultaneously as both a host and a device. For example, the host system 200 of FIG. 2 can act in some embodiments simultaneously as both a host and a device.

In some embodiments, the device at the host system 200 is presented as a Mass Storage Device Class, facilitating the establishment of direct attached storage subsystem capability. In some embodiments, the device at the host system 200 is presented as an Ethernet Emulation Mode Communication Device Class Interface, facilitating the establishment of a network attached storage (NAS) subsystem capability.

In some embodiments, the host at the other end of the cable sees the host system 200 as a device. For example, in some embodiments, the host at the other end of the cable sees the host system 200 as a storage hard disk drive (HDD) letter just as it would see any other USB 3.0 storage device such as a thumb drive. As such, the host at the other end of the host to host cable requires no special hardware or software to participate in the peer to peer connection. All of the additional logic is resident at the host system 200 (that is, the host that is operating as a device).

In some embodiments, the special USB A to USB A cable connecting the two hosts indicates when a host (for example, a personal computer) is to operate as a USB device, and the cable may have special markings to indicate which end to plug into the intended "device". In some embodiments, the special USB A to USB A cable connecting the two hosts does not electrically connect the VBus power signal between the two USB A plugs at each end of the cable. In some embodiments, the special USB A to USB A cable connecting the two hosts cross connects the receiver (Rx) and transmitter (Tx) signals. In some embodiments, the special USB A to USB A cable connecting the two hosts connects the D+/D− signals to provide sideband signaling.

In some embodiments, the host system 200 operating as a device temporarily shorts the cable connecting the two hosts at it's end (that is, at the "device end" of the cable) to indicate that the host system 200 (for example, a personal computer) is to act as the "device". The temporary short may be created using a simple RC (resistor and capacitor in series) circuit into the gate of a field effect transistor (FET) and/or a well controller pattern, etc. The short may be readily directed to an existing port over-current detection mechanism. When the short is detected, it is input to a USB 3.0 host (for example, USB 3.0 host 204), which in turn routes the PHY within the USB 3.0 host to become a USB 3.0 device (for example, using USB 3.0 client 208).

In some embodiments, a USB host operating as a USB device acts like any other USB device (for example, a USB 3.0 device), and from the perspective of the host at the other end of the cable, is indistinguishable from any other USB device of its device class. In some embodiments, the device interface may be generated by software (for example, a device driver) on the device system, and presents the file system in the same manner as any direct attached, or network attached storage (NAS) system, for example. The driver may optionally present only a subset of the file system (for example, such as the user's "My Documents" directory). In some embodiments, the host at the far end of the cable sees the device side as a storage subsystem, and presents it as, for example, an HDD LUN (hard disk drive logical unit number) to the user on the host machine in a manner that is the same as it would for any other attached storage device (for example, any other USB attached storage device).

Figure 3:
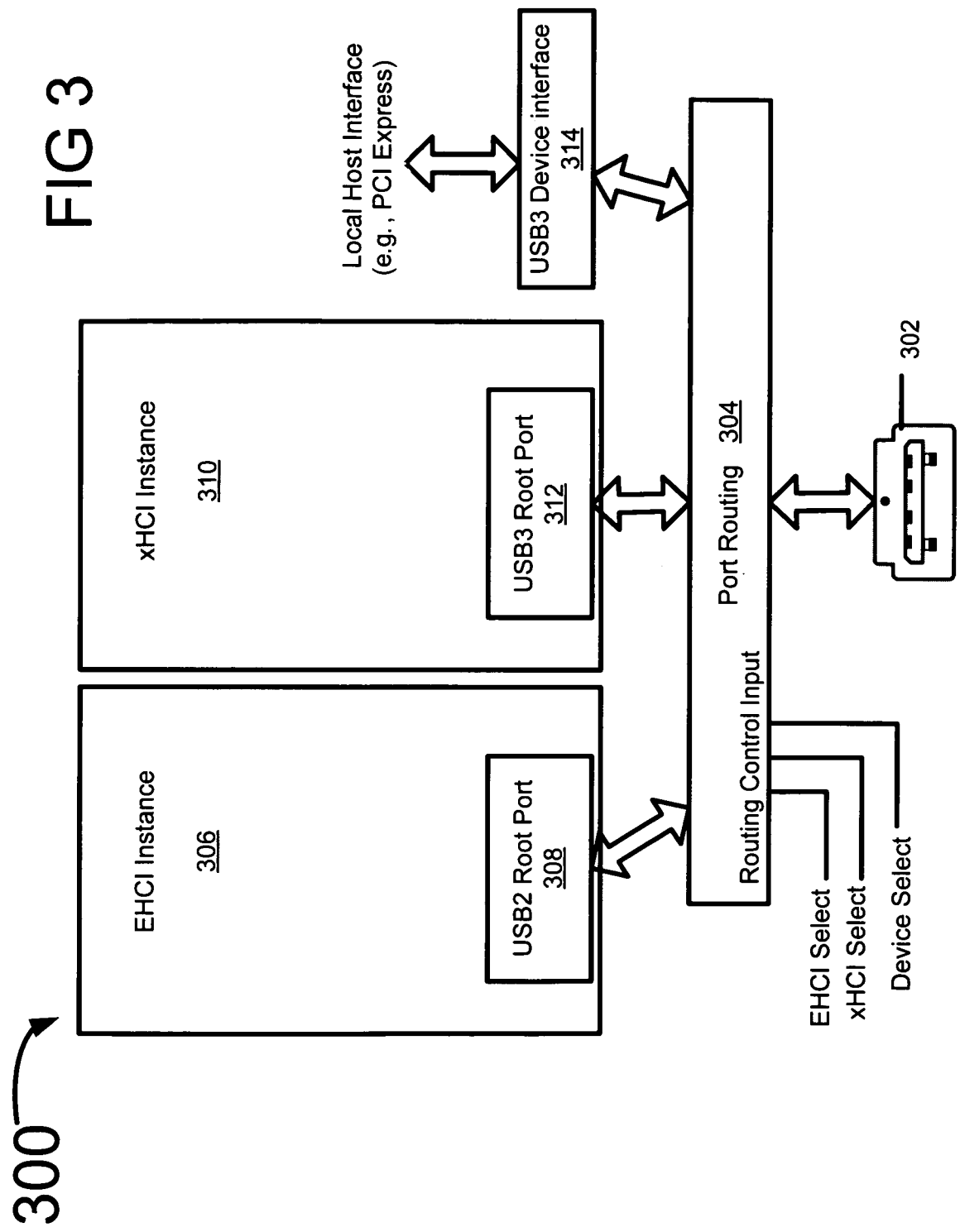
FIG. 3 illustrates a system according to some embodiments of the inventions.

FIG. 3 illustrates a system 300 according to some embodiments. In some embodiments, system 300 is a USB 3.0 host system that is able to operate as a USB 3.0 host or as a USB 3.0 device, for example. In some embodiments system 300 includes a USB receptacle 302 (for example, a USB 2.0 and/or a USB 3.0 receptacle), port routing 304, an EHCI (Enhanced Host Controller Interface) instance 306, a USB 2.0 root port 308, an xHCI (Extensible Host Controller Interface) instance 310, a USB 3.0 root port 312, and a USB 3.0 device interface 314.

In some embodiments system 300 performs USB 3.0 device detection, and uses the existing port routing logic 304 to steer (when appropriate) the physical connection of the contacts of the USB 3.0 receptacle 302 to the USB 3.0 device interface 314. This enables USB host system 300 to operate as a USB device, for example, and connect the USB cable plugged into receptacle 302 via USB 3.0 device interface 314 to the local host interface (for example, a peripheral component interconnect express bus or PCI Express bus). Routing control input signals to port routing 304 include an Enhanced Host Controller Interface (EHCI) select signal, an Extensible Host Controller Interface (xHCI) select signal, and a device select signal. These select signals can be used in some embodiments by the port routing logic 304 to route signals to/from USB 3.0 receptacle 302 from/to the appropriate one of the EHCI instance 306, the xHCI instance 310, or the USB 3.0 device interface 314.

Figure 4:
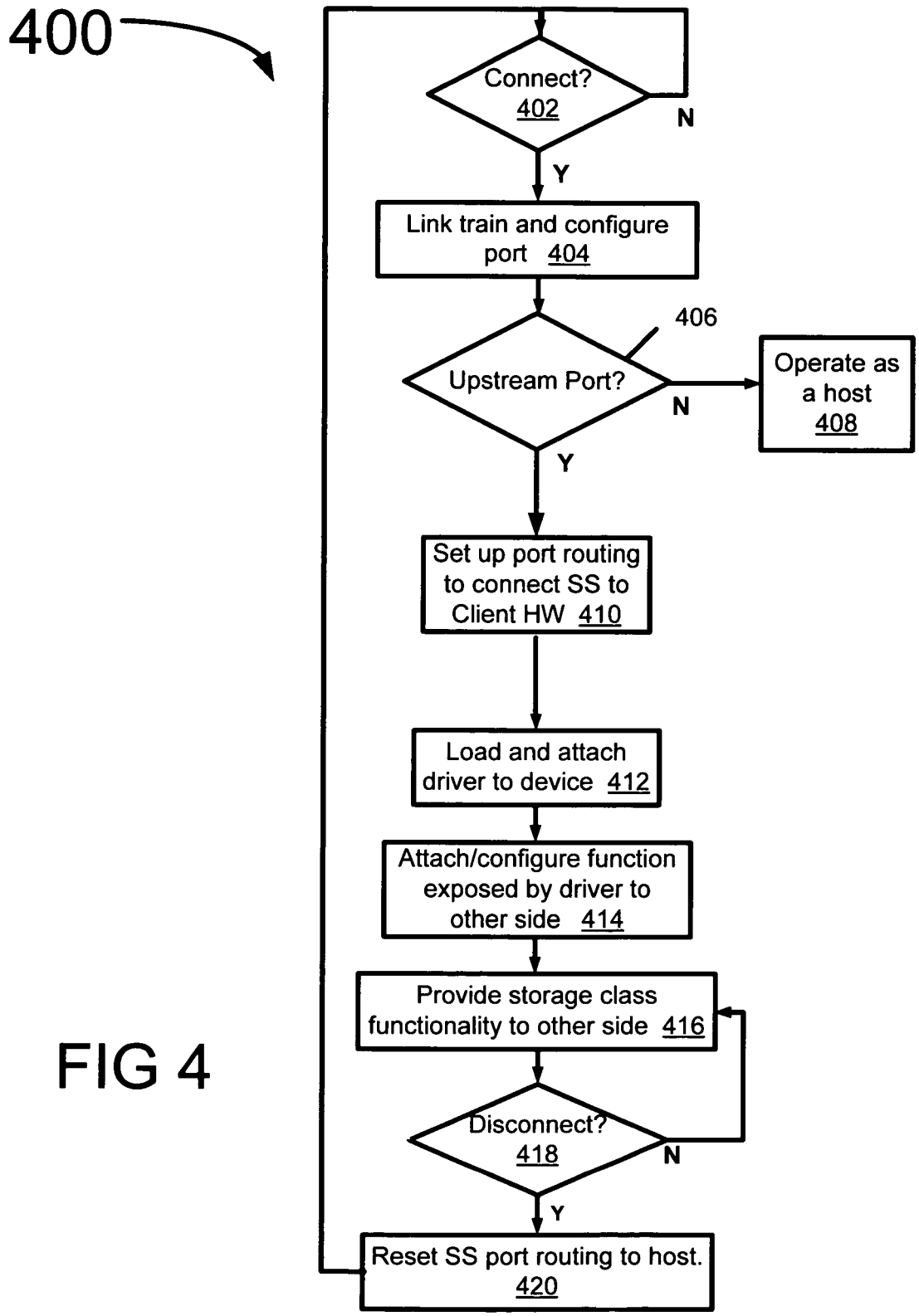
FIG. 4 illustrates a flow according to some embodiments of the inventions.

FIG. 4 illustrates a flow 400 according to some embodiments. In some embodiments, flow 400 is an example of a flow from connection to disconnection of a USB host system (for example, host system 200 of FIG. 2 and/or host system 300 of FIG. 3) to operate as a USB device (for example, as Mass Storage Class device). In some embodiments, bi-modal USB 3.0 port role detection and assignment is implemented, leading to a rerouting of USB 3.0 SuperSpeed (SS) signaling to the USB 3.0 device hardware in order to allow a USB 3.0 host system to operate as a SuperSpeed (SS) USB 3.0 device.

At 402 a determination is made as to whether a connection has been made between a port of the USB host system and a port of another USB host or a port of a USB device has been made. This may be accomplished, for example, by a Tx and an Rx seeing each other at each end. Once the determination has been made at 402 that a USB host or device has been coupled to the host system, then link training is performed and the host system port is configured (for example, as a SuperSpeed device) at 404.

In some embodiments, a port of the host or device at each end of the link uses port capability link management packets that describe each port's link capabilities, and is sent by both link partners after the successful completion of training and link initialization. In some embodiments, the ports at each end of the link negotiate with each other to determine how the host/device at each end of the link will operate. The ports negotiate at 406 which is to operate as the upstream port and which as the downstream port. If the host system port is not the upstream port at 406, then port routing is set up at 408 to connect the USB host system hardware and the host system will operate as a host. If the USB host system port is the upstream port at 406, then port routing is set up at 410 to connect SuperSpeed (SS) USB 3.0 client hardware. At 412, a driver is loaded and attached to the device. At 414 an attach/configure function exposed by the driver to the host at the other side of the USB cable is implemented. At 416, storage class functionality is provided to the host at the other side of the USB cable. At 418, a determination is made as to whether the USB cable has been disconnected from the host system operating as the device. Storage class functionality is continued to be provided to the host at the other side of the USB cable until a determination is made at 418 that the USB cable has been disconnected. Once this determination is made at 418, the SuperSpeed (SS) port routing to the host is reset at 420, and flow is returned to 402.

Figure 5:
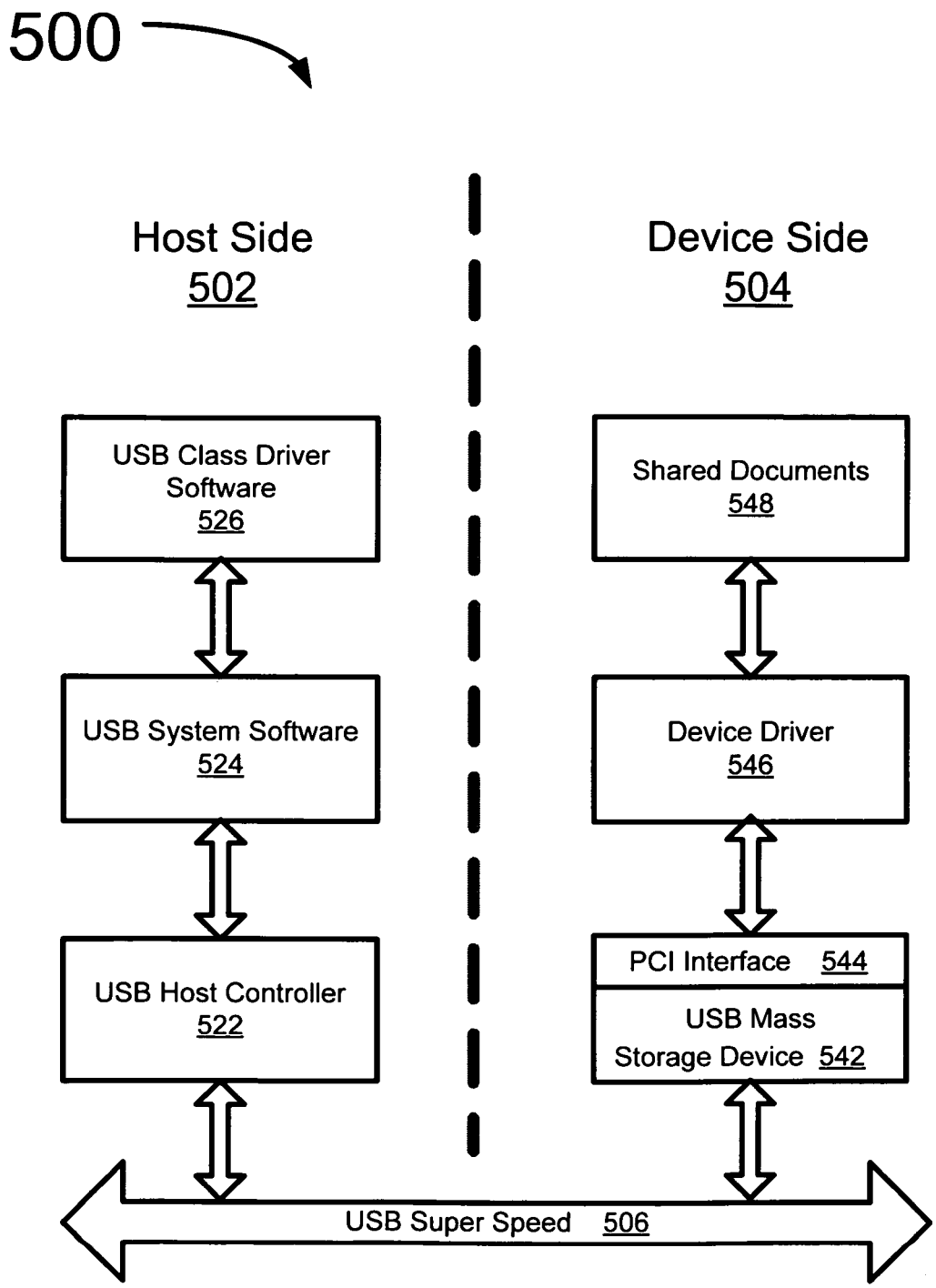
FIG. 5 illustrates a system according to some embodiments of the inventions.

FIG. 5 illustrates a system 500 according to some embodiments. In some embodiments, system 500 includes a host side 502 coupled to a device (client) side 504 via a USB SuperSpeed (SS) cable (or USB 3.0 cable). In some embodiments, device side 504 is a USB host system that can operate as a USB device. For example, in some embodiments, device side 504 is the same as or similar to system 200 illustrated in FIG. 2 and described in reference thereto, and/or is the same as or similar to system 300 illustrated in FIG. 3 and described in reference thereto. In some embodiments, host side 502 includes a USB Host Controller 522, USB system software 524, and USB class driver software 526. In some embodiments, device side 504 includes USB mass storage device enumeration 542, a peripheral component interconnect (PCI) interface 544, one or more device drivers 546, and shared documents 548 (for example, shared documents 548 can include in some embodiments movies, music, and/or other documents).

System 500 is an exemplary embodiment of a typical software stack involving a USB host system and a client mass storage device (for example, a host system acting as a client mass storage device). FIG. 5 illustrates the situation after a connection is made between the host side 502 and the device side 504 is detected and enumeration of the mass storage device is complete from both the perspectives of the host side 502 and the client side 504. This condition may be achieved, for example, via use of hot-add and enumeration methods typical in many USB and PCI Express implementations currently available. On the host side 502, applications gain access to the mass storage device 542 using its USB class driver software 526. On the client side 504, the device driver 546 provides a way to move packets from USB and assembling them back into file images. These file images are then presented to the file system subsystem for storage on the system disk drive of the host system that is the device side 504.

In some embodiments, a hardware based implementation may be made, for example, in sync and go applications. For example, in some embodiments, a personal computer with Viiv technology may be used to connect to a notebook computer using a USB A to USB A cable for fast connection speeds and transfer of data and/or information.

In some embodiments, applications may be made in a manner where a host system is able to push "download to rent/buy" media applications, including, for example, movies, video, music, documents, and/or other media, etc. For example, implementations may be made where walk up video, high definition video kiosks (for example, DVD, HD-DVD, Blu Ray, etc.) are used to extend the interactive experience. For example, in some embodiments, music and/or video store downloads may be made (for example, interactive DVD, HD-DVD, Blu Ray, etc.) at fast speeds (for example, USB 3.0 speeds). These kiosks may be provided by existing media distributors and/or in locations such as airports, convenience stores, etc. Many different platforms may be used in some embodiments. For example, in some embodiments, fixed function media play platforms may be used (for example, portable or non-portable players including but not limited to next generation PSPs, Arcos personal players, personal music and/or personal video players, etc.)

In some embodiments, a USB 3.0 host may be used to operate as a USB 3.0 device to allow what would appear to be a host to host connection to be made in a manner that is transparent to a user. In some embodiments, standard (for example, operating system delivered) features such as USB mass storage device driver, device letter, and/or file drag and drop may be used to move content between two host systems. The use of these standard mechanisms allows existing applications such as sync and go to just work without any additional user intervention being required.

In some embodiments, a file transfer may be made between computers, for example, in a user's home, and/or to augment a commercial download management system.

Although some embodiments have been described herein as being USB 3.0 embodiments, according to some embodiments these particular implementations may not be required. For example, some implementations are performed using other USB embodiments such as USB 2.0. It is also contemplated that future versions and/or implementations of USB and/or other fast bus implementations may be performed according to some embodiments of the inventions.

Although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, the interfaces that transmit and/or receive signals, etc.), and others.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. An apparatus comprising:
    a detector to detect a host operating as a host or a host operating as a device coupled via a link; and
    a first port to negotiate with a port of the detected host and to determine whether the detected host is to operate as a host and/or as a device, wherein a bus training sequence is used to establish communication with the port of the detected host and operation of the detected host operating as a host or the detected host operating as a device is dynamically swapped at the detected host, and in response to the negotiation the detected host and another host of the first port are to act simultaneously as both a host and a device.

2. The apparatus of claim 1, wherein the host operating as a host is a Universal Serial Bus host, the host operating as a device is a Universal Serial Bus device, and the link is a USB cable.

3. The apparatus of claim 2, wherein the USB host is a Universal Serial Bus 3.0 host, the USB device is a Universal Serial Bus 3.0 device, and the USB cable is a USB 3.0 cable.

4. The apparatus of claim 1, wherein the link is a USB A to USB A type USB cable.

5. The apparatus of claim 1, wherein the link is a USB A to USB A type USB 3.0 cable.

6. The apparatus of claim 1, wherein when the port operates as a device the apparatus externally appears to be a device.

7. The apparatus of claim 1, wherein the port operates as a host and as a device.

8. A system comprising:
    a first host;
    a second host; and
    wherein the second host includes:
        a detector to detect the first host coupled to the second host via a link; and
        a first port to negotiate with a port of the first host and to determine whether to operate the second host as a host and/or as a device, wherein a bus training sequence is used to establish communication with the port of the first host and operation as a host or device is dynamically swapped at the first host and the second host at one or both of the first host or the second host, and in response to the negotiation the detected host and another host of the first port are to act simultaneously as both a host and a device.

9. The system of claim 8, wherein the first host is a Universal Serial Bus host, the second host is a Universal Serial Bus host, and the link is a USB cable.

10. The system of claim 8, wherein the first host is a Universal Serial Bus 3.0 host, the second host is a Universal Serial Bus 3.0 host, and the link is a USB 3.0 cable.

11. The system of claim 8, wherein the link is a USB A to USB A type USB cable.

12. The system of claim 8, wherein the link is a USB A to USB A type USB 3.0 cable.

13. The system of claim 8, wherein when the second host operates as a device it appears to the first host to be a device.

14. The system of claim 8, wherein the second host operates as a host and as a device.

15. A method comprising:
    detecting a host or device coupled via a link;
    negotiating with a port first of the detected host or device, wherein a bus training sequence is used to establish communication with the port of the detected host or device; and
    determining whether to operate as a host and/or as a device in response to the negotiating, wherein operation as a host or device is dynamically swapped at one or both of the host or the device, and in response to the negotiation the detected host and another host of the first port are to act simultaneously as both a host and a device.

16. The method of claim 15, wherein the link is a USB cable, and wherein the determining determines whether to operate as a USB host and/or as a USB device.

17. The method of claim 15, wherein the link is a USB 3.0 cable, and wherein the determining determines whether to operate as a USB 3.0 host and/or as a USB 3.0 device.

18. The method of claim 15, wherein the link is a USB A to USB A type USB cable.

19. The method of claim 15, wherein the link is a USB A to USB A type USB 3.0 cable.

20. The method of claim 15, wherein the second host operates as both a host and a device.

21. The apparatus of claim 1, wherein the detector detects the host or device by detecting a port power overcurrent.

22. The system of claim 8, wherein the detector detects the host or device by detecting a port power overcurrent.

23. The method of claim 15, further comprising detecting the host or device by detecting a port power overcurrent.

\* \* \* \* \*